(12) United States Patent
Actis

(10) Patent No.: US 10,633,129 B2
(45) Date of Patent: Apr. 28, 2020

(54) STRAP WELDING SYSTEM AND METHOD

(71) Applicant: H.W.J. DESIGNS FOR AGRIBUSINESS, INC., Clovis, CA (US)

(72) Inventor: Bradley P. Actis, Clovis, CA (US)

(73) Assignee: H.W.J. Designs for Agribusiness, Inc., Clovis, CA (US)

( * ) Notice: Subject to any disclaimer, the term of this patent is extended or adjusted under 35 U.S.C. 154(b) by 1943 days.

(21) Appl. No.: 13/849,436

(22) Filed: Mar. 22, 2013

(65) Prior Publication Data

US 2013/0247515 A1 Sep. 26, 2013

Related U.S. Application Data

(60) Provisional application No. 61/614,082, filed on Mar. 22, 2012.

(51) Int. Cl.
| | |
|---|---|
| B65B 13/02 | (2006.01) |
| B29C 65/00 | (2006.01) |
| B65B 13/32 | (2006.01) |
| B29C 65/06 | (2006.01) |

(52) U.S. Cl.
CPC .......... *B65B 13/02* (2013.01); *B29C 65/0618* (2013.01); *B29C 66/1122* (2013.01); *B29C 66/4322* (2013.01); *B29C 66/4324* (2013.01); *B29C 66/73921* (2013.01); *B29C 66/8163* (2013.01); *B29C 66/81433* (2013.01); *B29C 66/8221* (2013.01); *B29C 66/8225* (2013.01); *B29C 66/8242* (2013.01); *B29C 66/82265* (2013.01); *B29C 66/83241* (2013.01); *B65B 13/32* (2013.01)

(58) Field of Classification Search
CPC ......... B65B 13/02; B65B 13/04; B65B 13/20; B65B 13/24; B65B 13/32
USPC ..................... 53/399, 586, 589; 100/2, 3, 26
See application file for complete search history.

(56) References Cited

U.S. PATENT DOCUMENTS

| | | |
|---|---|---|
| 557,088 A | 3/1896 | Swenson |
| 2,131,502 A | 9/1938 | Elliot |
| 2,173,071 A | 9/1939 | Gaus et al. |
| 2,834,212 A | 5/1958 | Wollner |
| 2,866,504 A | 12/1958 | Syers |

(Continued)

FOREIGN PATENT DOCUMENTS

| | | |
|---|---|---|
| AU | 465800 B2 | 6/1974 |
| CA | 2113780 A1 | 8/1994 |
| CN | 2859503 Y | 1/2007 |

OTHER PUBLICATIONS

International Preliminary Report on Patentability dated Sep. 23, 2014 from corresponding International Application No. PCT/US2013/033602 filed Mar. 22, 2013 (6 pages).

(Continued)

*Primary Examiner* — Chelsea E Stinson
*Assistant Examiner* — Mary C Hibbert-Copeland
(74) *Attorney, Agent, or Firm* — Klein, O'Neill & Singh, LLP

(57) ABSTRACT

Bale strap assemblies for strapping a pressed bale are materials capable of being strapped are discussed herein. The bale strap assemblies account for jumping affects at the weld jaws due to reciprocating motions of the crank on the connecting rod and are adjusted by varying relative positions between the crank and the weld jaws.

17 Claims, 10 Drawing Sheets

(56) References Cited

U.S. PATENT DOCUMENTS

| | | | |
|---|---|---|---|
| 2,950,589 A | 8/1960 | Litchard | |
| 3,064,482 A | 11/1962 | Wollner | |
| 3,347,102 A | 10/1967 | Phillips | |
| 3,464,298 A | 9/1969 | Roach | |
| 3,492,781 A | 2/1970 | Ray | |
| 3,830,038 A | 8/1974 | Propst | |
| 3,994,116 A | 11/1976 | McCormick | |
| 4,023,330 A | 5/1977 | Williams | |
| 4,300,327 A | 11/1981 | Bridger | |
| 4,566,378 A | 1/1986 | Fleissner | |
| 5,088,271 A | 2/1992 | Westaway | |
| 5,178,020 A | 1/1993 | Elam et al. | |
| 5,201,166 A | 4/1993 | Johnsen | |
| 5,511,364 A | 4/1996 | Levi et al. | |
| 6,386,026 B1 | 5/2002 | Zamfes | |
| 6,487,833 B1 * | 12/2002 | Jaenson | B65B 13/32 100/2 |
| 6,662,532 B1 | 12/2003 | Droog et al. | |
| 6,955,029 B2 | 10/2005 | Palumbo | |
| 7,013,625 B2 | 3/2006 | Curles | |
| 7,134,256 B2 | 11/2006 | Kujubu et al. | |
| 7,603,833 B2 | 10/2009 | Koke | |
| 2006/0196150 A1 | 9/2006 | Van De Sande | |

OTHER PUBLICATIONS

International Search Report completed Jul. 29, 2013 from corresponding International Application No. PCT/US2013/033602 filed Mar. 22, 2013 (5 pages).

Written Opinion completed Jul. 29, 2013 from corresponding International Application No. PCT/US2013/033602 filed Mar. 22, 2013 (4 pages).

"A Guide for Cotton Bale Standards," the National Cotton Council of America, Jul. 2001 revision, Memphis, TN, https://www.cotton.org/tech/bale/upload/guide-cotton-bale-standards.pdf.

United States District Court for the Eastern District of California, Defendant L.P. Brown Company, Inc.'s Responses to Second Set of Interrogatories, Civil Action No. 1:17-cv-00272-AWI-SKO, Jul. 17, 2017.

United States District Court Eastern District of California, Defendant Rethceif Enterprises LLC's Responses to Plaintiff H.W.J.'s Second Set of Interrogatories (Nos. 10-13), Case No. 1:17-CV-0272-AWI-SKO, Jul. 17, 2017.

* cited by examiner

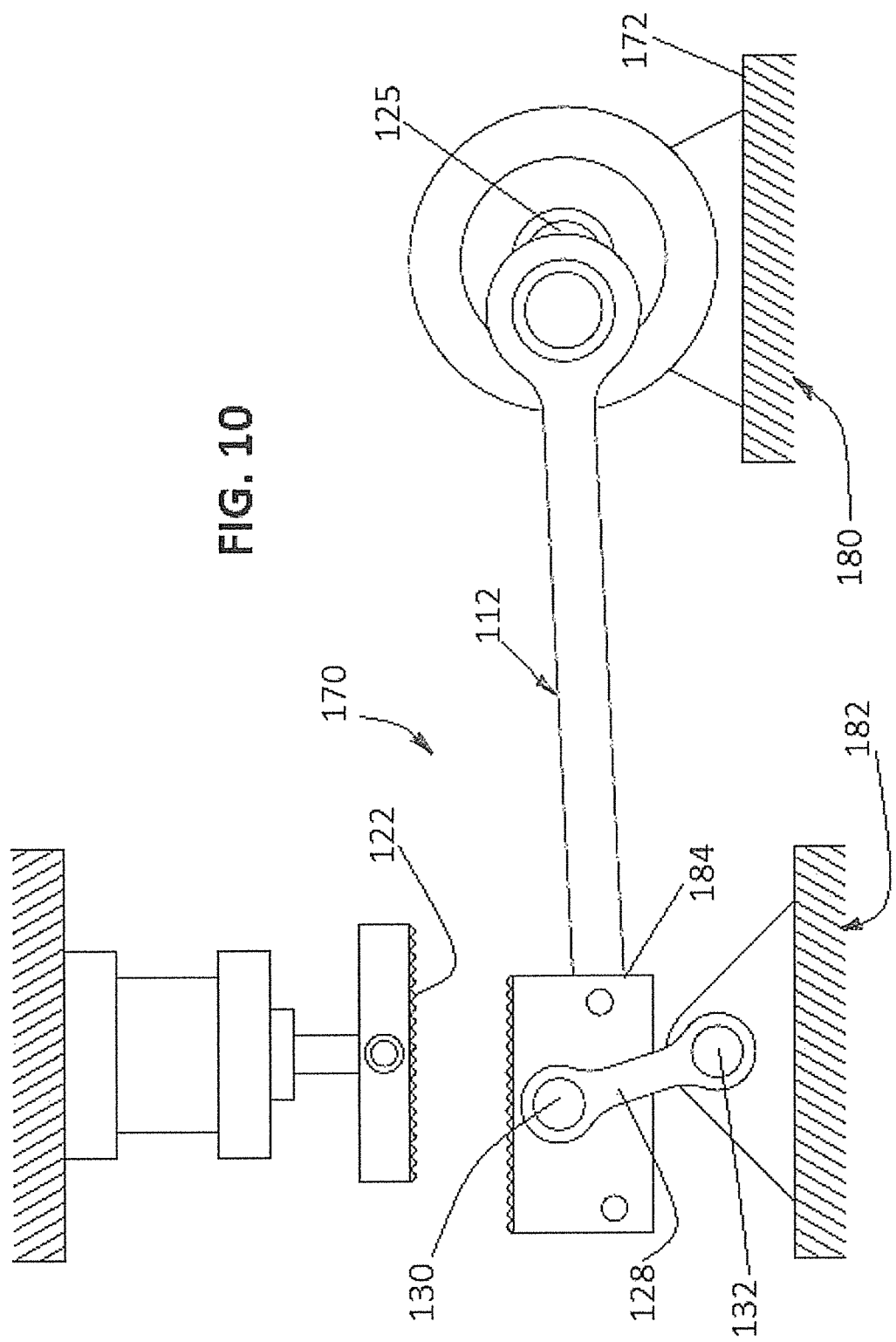

STRAP WELDING SYSTEM AND METHOD

FIELD OF ART

The present disclosure generally relates to an apparatus and method for automatically strapping bales of cotton, other fibers, or stacks of articles, such as lumber, bricks, shipping boxes, which are suitable for strapping. More specific discussions relate to a system and method for welding the ends of thermoplastic straps together so as to form strapped bales of cotton or any other desired materials or items.

BACKGROUND

In the cotton industry, the process of strapping a bale has been, for the most part, transitioned from using humans to manually tie bales to using automated machines to automatically strap bales. In the cotton or fiber industry, there are generally three ways in which to secure a bale after the bale has been pressed. These three ways include: pre-formed steel wires having interlocking ends, flat ribbon-steel bands having their ends inserted into a crimp and crimped and flat thermoplastic strapping material that are welded together.

Pre-formed steel wires may be tied by pivotally mounted wire bend assemblies which take the place of workers on each side of the baling press. The workers bend the tie wires around a bale by inserting the ends of the tie wires into a wire tie guide assembly. However, workers are still required to individually load each of a plurality of tie wires into the wire bend assemblies.

Bale tying using flat steel straps is hindered primarily by the cost of the strapping material, the complexity of the machinery used, and the speed at which the machinery is able to operate. In addition, the sheer weight of the steel strap tie material and its substantially sharp edges make the material cumbersome and dangerous to handle.

Conversely, plastic or other non-ferrous material is ideal for strapping bales of cotton or other fibers. Plastic is relatively lightweight, can be formed into a variety of widths and thicknesses and has relatively soft edges, allowing for easy handling and lower shipping costs. Plastic or other non-ferrous strapping material is competitive with wire ties on a cost per bale basis and is easily adaptable to fully automatic tying machinery. Additionally, plastic or other non-ferrous strapping material is readily recyclable by the end user and is considered substantially safer than steel strapping material, particularly in instances of strap breakage.

Generally, automatic bale strapping device are categorized as up-packers, wherein baling chambers reside underneath the bale strapping device, often under the floor or ground, and down-packers, wherein baling chambers are located above the bale strapping device. Down-packers can also incorporate doors instead of enclosed bale chambers.

Down-packer-type presses are generally less expensive to purchase and install as much, if not all, of the work is done above ground. However, a down-packer-type press tends to give up some performance advantages, namely, cycle time or bales-per-hour.

Bale strapping systems for feeding straps over a pressed bale and then welding the two ends of each strap together to produce a strapped bale are well known. Exemplary bale strapping systems are disclosed in U.S. Pat. Nos. 7,841,272 and 6,536,336, the contents of which are expressly incorporated herein by reference for all purposes. A strapped bale typically has 6 or 8 straps. In practice, three serially connected bale strap assemblies in a bale strapping system can produce three straps at a time and then indexed to another section of the same bale to produce three additional straps for a total of six straps. For an eight-strap system, four bale strap assemblies are typically used with indexing to form eight straps. A bale strapping system may also include six or eight bale strap assemblies to produce all of the straps in the same strapping procedure.

As disclosed in the '272 and '336 patents, each bale strap assembly has numerous moving parts and parts that rotate about respective pivot pins. When these parts operate at high speed and cycle over and over during normal service, the parts can wear and sometimes prematurely if not correctly set or aligned.

SUMMARY

Aspects of the present disclosure include a method for welding two ends of a strap. For example, the strap can be positioned around a pressed bale and welded to maintain the bale in the pressed position. The straps can be positioned around a loose bundle of articles to strap them together. In some examples, the method comprises the steps of placing the two ends in between a stationary weld jaw and a fixed weld jaw and causing the stationary weld jaw and the fixed weld jaw to press the two ends; a weld plane is defined between the two weld jaws; fixing the fixed weld jaw to a connecting rod to prevent rotational and translational movement between the two; securing a link to the fixed weld jaw by first pin and a lower end of the link to a structure by a second pin; securing the connecting rod to a crank and rotating the crank; and adjusting a centerline of the crank relative to the first pin.

Another feature of the method wherein the adjusting step comprises increasing a length of the crank.

Another feature of the method wherein the adjusting step comprises raising a base connected to the crank.

Another feature of the method wherein the adjusting step comprises adding shims.

Another feature of the method further comprising lowering, elevation-wise, the weld plane.

Another feature of the method further comprising adjusting an angle between a centerline of the connecting rod and the weld plane.

A further aspect of the present disclosure is a system for welding comprising a plurality of weld assemblies. According to some examples, each of said weld assemblies can comprise a stationary weld jaw substantially stationary from translational movement; a fixed weld jaw secured to a connecting by at least two secured points; said fixed weld jaw and said connecting rod are fixed from rotational and translational movement relative to one another; a link pivotably connected to the fixed weld jaw by a first pivot pin and pivotably connected to a structure by a second pivot pin to angularly rotate relative to the fixed weld jaw and the structure; a crank pivotably connected to the connecting rod to impart reciprocating motion on the connecting rod; and wherein a centerline of the crank is adjustable relative to the first pivot pin.

Another feature of the system further comprising a second through six weld assembly located side-by-side.

Another feature of the system further comprising a tensioner operatively connected to the crank to change the position of the crank relative to the weld plane.

Another feature of the system further comprising a plurality of shims to change the position of the crank relative to the weld plane.

Another feature of the system further comprising a plurality of teeth on the surface of stationary weld jaw and the fixed weld jaw.

Another feature of the system wherein the at least two secured points are fixed pins.

Another feature of the system wherein the crank is operatively connected to a pulley system.

A still further aspect of the present disclosure is a weld assembly, said weld assembly comprising a stationary weld jaw substantially stationary from translational movement; a fixed weld jaw secured to a connecting by at least two secured points; said fixed weld jaw and said connecting rod are fixed from rotational and translational movement relative to one another; a link pivotably connected to the fixed weld jaw by a first pivot pin and pivotably connected to a structure by a second pivot pin to angularly rotate relative to the fixed weld jaw and the structure; a crank pivotably connected to the connecting rod to impart reciprocating motion on the connecting rod; and wherein a centerline of the crank is adjustable relative to the first pivot pin.

BRIEF DESCRIPTION OF THE DRAWINGS

These and other features and advantages of the present device, system, and method will become appreciated as the same becomes better understood with reference to the specification, claims and appended drawings wherein:

FIGS. 7-10 are various views of an alternative weld assembly at four different crank positions.

DETAILED DESCRIPTION

The detailed description set forth below in connection with the appended drawings is intended as a description of the presently preferred embodiments of strap welding systems and related methods provided in accordance with aspects of the present disclosure and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
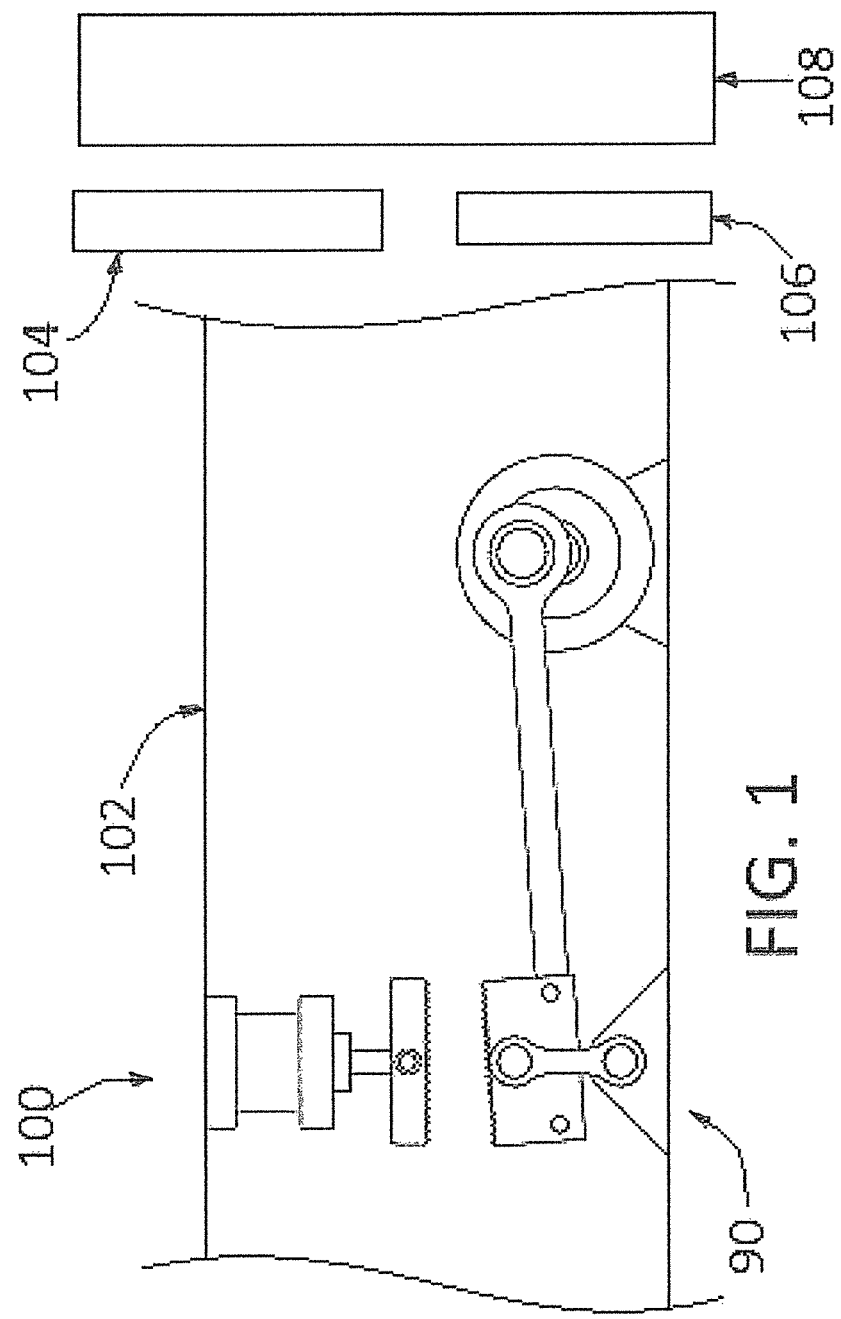
FIG. 1 is a schematic drawing showing a welding system having a plurality of weld assemblies and feeder assemblies attached to a press device.

With reference now to FIG. 1, a schematic side view of a bale strapping system is shown, which is generally designated 100. The bale strapping system 100 can comprise three, four, six, or eight bale strap assemblies 90 in a side-by-side configuration. Each bale strap assembly 90 comprises a weld assembly 102 and a feeder assembly 104, also referred to as a load assembly, along with actuators, motors, rollers, brackets, channels, cutters, etc. for feeding straps around a pressed bale and for welding the two ends of each strap together, as disclosed in the '272 and '336 patents. The strap assemblies 90 are mounted in a side-by-side arrangement on a frame assembly 106 for mounting the bale strapping system 100 onto a bale press machine 108, such as onto a base or platen of a down-packer or up-packer. The platen or base typically has slotted channels for receiving straps fed by the feeder assembly 104 and welded by the weld assemblies 102.

Figure 2:
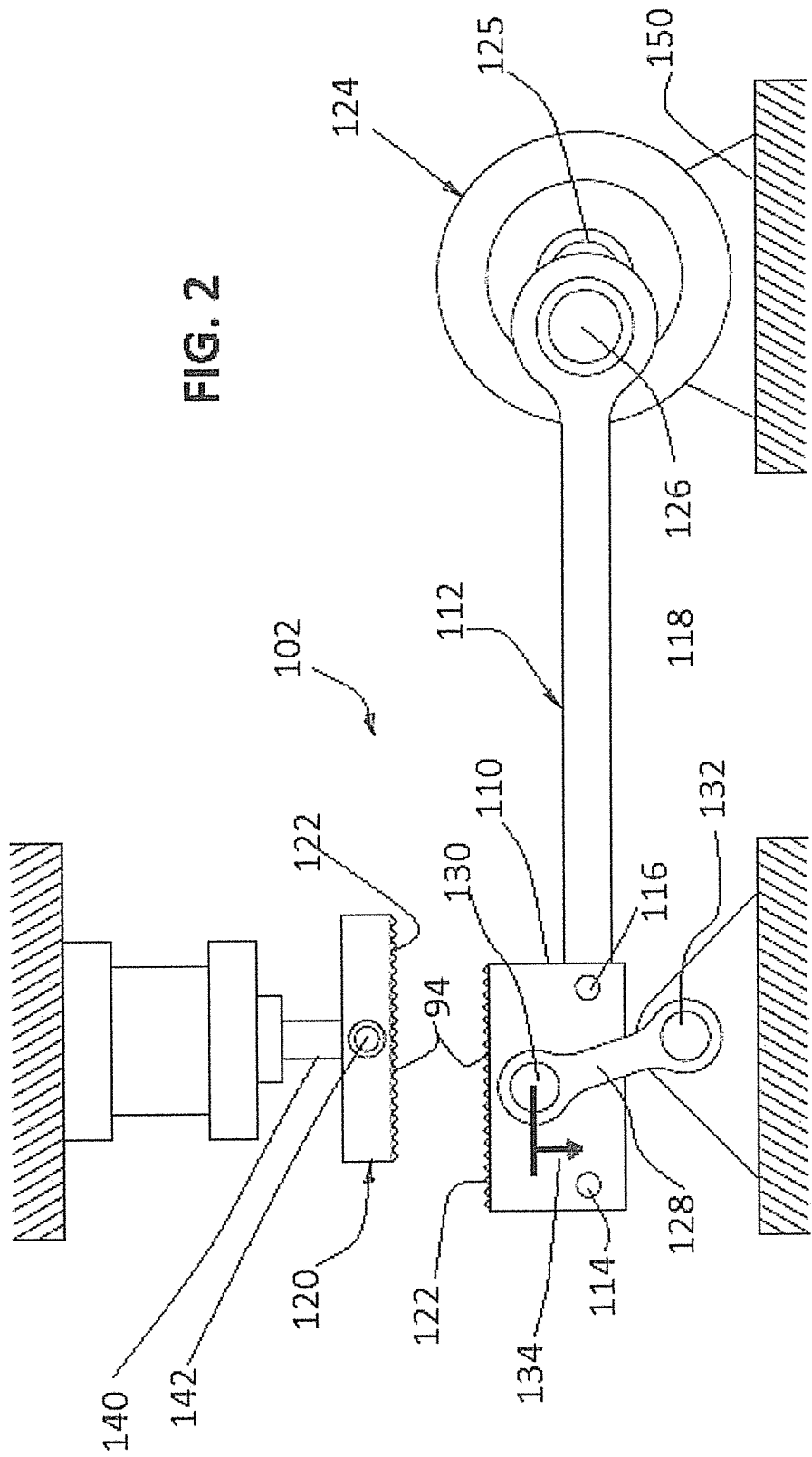
FIG. 2 is an enlarged schematic view of the weld assembly of FIG. 1.

With reference now to FIG. 2, the weld assembly 102 of FIG. 1 is shown in schematic, which comprises a weld jaw 110 connected to a connecting rod 112 at pins 114 and 116 without a wrist pin. The two pins 112, 114 fixedly secure the weld jaw 110 to the aim 118 of the connecting rod 112 from relative movement between the two, both rotational and translational. As the weld jaw is fixed relative to the arm, it may be referred to as a fixed weld jaw, as opposed to the stationary but pivotable weld jaw 120, as further discussed below. As shown, the fixed weld jaw 110 is located below the stationary weld jaw 120, which represents a lower position relative to the ground and a higher position further away from the ground. In an alternative embodiment, the arrangements can be reversed in that the fixed weld jaw is located above the stationary weld jaw. The two weld jaws 110, 120 have teeth 94 to facilitate gripping the strap located therebetween.

The connecting rod 112 is horizontally mounted to the welding plane surfaces 122, in which two ends of a strap (not shown) are pressed together for friction weld. In other words, the axis of the arm 118 is generally parallel to the welding plane surfaces 122. The horizontally mounted connecting rod is believed to best translate the forces generated in a reciprocating welding process when the motor 124 rotates the crank 125 and the eccentric pivot rod or pin 126 produces a reciprocating motion on the connecting rod 112. In an alternative embodiment, a belt driven pulley system is used, which is connected to the crank 125.

A link 128 is connected to the fixed weld jaw 110 by an upper 130 pivot pin and a lower 132 pivot pin. The length of the link 128 and positions of the two pivot pins 130, 132 are sized so that the link 128 is at 90 degrees to the welding plane 122 of the fixed weld jaw when the crank 125 is at top dead center or bottom dead center as shown with reference to FIGS. 3 and 5. This allows for the link 128 to travel essentially the same distance during the rotation of the crank 125 on each side of 90 degrees to the welding plane. This characteristic is believed to give the smallest amount of fall in the direction of the arrow 134 to the weld jaw 110 welding plane 122 as the link 128 swings through its full travel on each side of the 90 degrees. The longer the link 128, and consequently the farther away the lower link pivot pin 132 is from the upper link pivot pin 130, the less is the fall 134 as the arc circle generated by the pivot motion of the longer link 128 produces a relatively flatter curve. However, system size and constraints usually limit the length that can be incorporated for the link 128.

Another characteristic of this type of welding system with the fixed jaw 110 and the horizontally mounted connecting rod 112 is a slight degree of rock or rocking to the weld surfaces 122 as the connecting rod 112 goes through 360 degrees motion at the crank 125. This rocking is normally compensated by mounting the stationary jaw 120 to a telescoping cylinder 140 via a pivot pin 142 in the same plane as the weld jaw 110 lower pivot pin 132. This will allow the stationary jaw 120 to maintain constant pressure without causing a pinch point at the ends of the two jaws when they are pressed together by allowing the two welding surfaces 122 of the two jaws 110, 120 to rock in unison during welding reciprocation, as further discussed below.

As described, the fixed weld jaw 110 and the connecting rod 112 can be treated as one rigid structure. When considering the center line of the crank 125 to center line of the weld jaw upper pivot 130 in a typical application, the center line of the crank 125 can be seen located below the weld jaw upper pivot 130 when viewed from the reference of the welding plane 122. When viewing this as a rigid structure, the motion of the crank 125 tends to want to push up on the weld jaw 110 as the crank 125 goes through its upswing rotation, such as from the six o'clock to the twelve o'clock positions. The crank 125 also tends to push down on the weld jaw as it goes through its downswing motion, from the twelve o'clock to the six o'clock positions. This loading in either direction can lead to a slight degradation of the weld quality as the weld system 100 is operated through its normal expected life. As the link pins 130, 132 of the weld jaw 110, and to some extent of the pin 142 of the stationary jaw 120, wear to even within standard acceptable tolerance for performance of the weld process, there will be more play in those parts due to the loading and jumping motions. This play can cause the weld jaw 110 to jump off the pin due to the rotational forces created by the crank 125 and the connecting rod 112 at the crank being below the upper pivot pin 130.

Typically friction is needed for a weld. This may be accomplished by forcing the stationary jaw 120 to come towards the weld jaw 110, for the weld jaw 110 to move up towards the stationary jaw 120, or for both to come together with each moving some distance towards the other. Because the stationary jaw 120 and the weld jaw 110 are being forced together to create the friction needed for a weld joint, the downward force that is created by the rotation and the crank 125 are not a factor because all of the components are loaded in that direction.

In one embodiment, the preferred system, apparatus, and method incorporate structures, features, and/or mechanisms that compensate or account for the unwanted loading due to the upswing and downswing caused at the weld jaw 110, and to some extent the stationary jaw 120, by the rotating crank 125. In one embodiment of the present device, system, and method, the center line of the crank 125 is adjusted, such as raised relative to the upper pivot pin 130 from the reference of the welding plane 122 to offset any pushing or pulling on the pivot pin. Any pushing or pulling can be offset, at least to some extent, by the raised distance. In one example, the distance raised is about 10 mils to about 100 mils or thousandths. In another embodiment, the distance raised is about 50 mils. However, if space is not a factor or constraint, the distance can be raised higher than 100 mils. In yet another embodiment, the distance raised is whatever the allowable limit within the design restraints and practicality so that the motion of the crank 125 is creating more down force to reduce the up thrust because of the direction of push.

Thus, in one example, a method is provided wherein the center line of the crank 125, such as the length of the crank, is raised relative to the upper pivot pin 130 by about 10 mils to about 100 mils. Another method provided herein is a method for reducing pushing or pulling on the weld jaw by raising the center line of the crank relative to the upper pivot pin 130. In another example, a base line gap or distance is measured between the axis of the upper pivot pin 130 and the axis of the crank 125 at top dead center. A determination is then made for any jumping at the weld jaw caused by the rotating crank. The method then includes the step of raising the center line of the crank by 10 mils to about 100 mils. In one example, a single shim or a plurality of shims 150 are used to raise the center line of the crank 125 relative to the pivot pin 130.

Typically the connecting rod 112 is attached to the weld jaw 110 below the upper pivot pin 130. In one embodiment, the connecting rod 112 is connected in-line with the upper pivot pin 130 of the weld jaw 110 and the center line of the crank 125 is higher by some distance above the horizontal as shown with reference to FIGS. 7-10, further discussed below. In addition thereto or alternatively, the crank 125 is left stationary and the weld plane 122 of the weld jaw 110 is lowered by 10 mils to about 100 mils. Because typical designs have the connecting rod 112 coupled to a location below the upper pin 130, the crank 125 is typically below the pin 130 centerline as well. Thus, in another aspect of the present device, system, and method, it has been found that even a slight increase in elevation of the crank 125 centerline relative to the pin 130 centerline, while still below the pin 130, can have improved results. As the connecting rod 112 is typically mounted below the pin 130 to achieve elevation of the crank 125, a slight "downward" angle within the mechanical limits of the connecting rod 112 can be tolerated to gain improvement described in the present disclosure. Thus, another aspect of the present method is a method for reducing jumping at the weld jaw by first obtaining a baseline height between the crank and the upper pivot pin, and increasing the height of the crank relative to the upper pin. In another example, a method for reducing jumping at the weld jaw is provided by first obtaining a base line angle between the connecting rod and the upper pin at top dead center of the crank, and decreasing the angle between the connecting rod relative to the upper pivot pin, other than horizontal.

In another example, the center line of the crank 125 is raised so that the connecting rod 112 is pushing down towards the welding jaw in any degree that the design or space will allow. This is limited by the structural characteristics of the connecting rod 112 and other mechanical limiting factors. In taking this standard design and raising the center line of the crank 125, lowering the weld plane 122 of the weld jaw 110 relative to the crank, or both, and then angling the connecting rod 112 down to the weld jaw 110 some amount other than horizontal with the welding plane 122 will achieve improved welding consistency over the life of the parts. In an embodiment, the link 128 is at 90 degrees to the welding plane 122 at top dead center of the crank 125 as traditional due to the rise and fall effect of the weld jaw.

As disclosed, aspects of the present disclosure are understood to include a bale strapping system comprising a weld assembly comprising two weld jaws, a crank attached to one of the weld jaws, a connecting rod fixedly attached to one of the weld jaws, and a crank rotatably connected to the connecting rod; and wherein relative positions between the crank and the pivot pin is accounted for to reduce jumping at the weld jaws. In another embodiment, the center line of the crank is raised relative to an upper pin on a fixed weld jaw. In still yet another example, the weld plane defined at the interface of the two weld jaws are lowered relative to the crank. In yet other examples, both the weld plane is lowered and the center line of the crank relative to an upper pin of the fixed weld jaw is raised. The base line value or data can be a value, amount or reading before checking or accounting for jumping at the weld jaws and the final value or values can be adjustments to the base line value or values.

Figure 3:
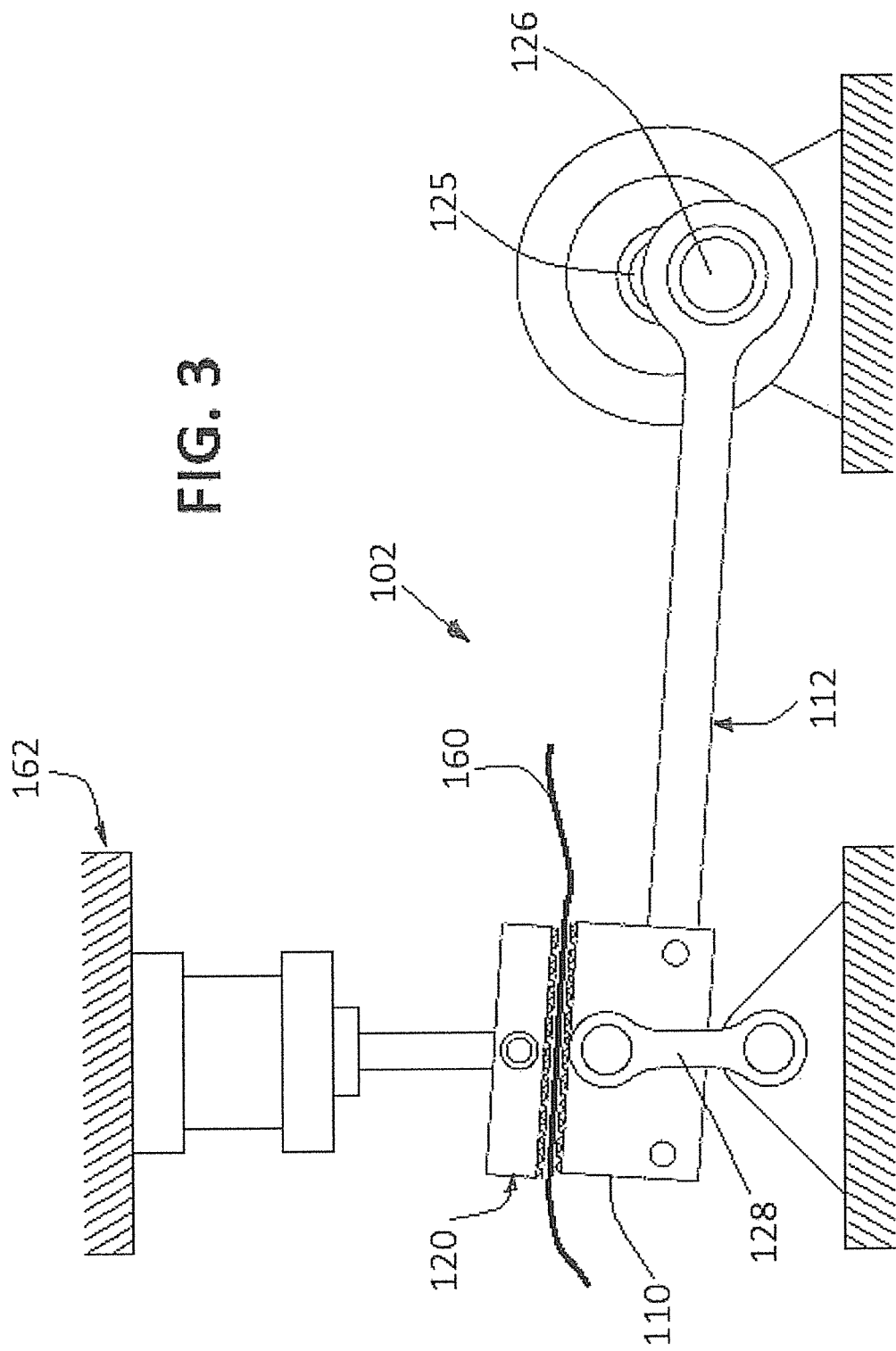
FIGS. 3-6 are various views of the weld assembly of FIG. 2 in service to weld two ends of a strap together.

FIGS. 3-6 depict the weld assembly 102 of FIG. 2 in service having two ends of a strap 160 positioned between the two weld jaws 110, 120 and frictionally welded together by the weld jaws. The weld location is understood to be inside a channel 162 of the base plate or platen of a press assembly, shown in schematic, with the strap 160 wrapped around a pressed bale (not shown). FIG. 3 shows the crank 125 at the six o'clock position and the link 128 generally perpendicular to the weld plane 122.

Figure 4:
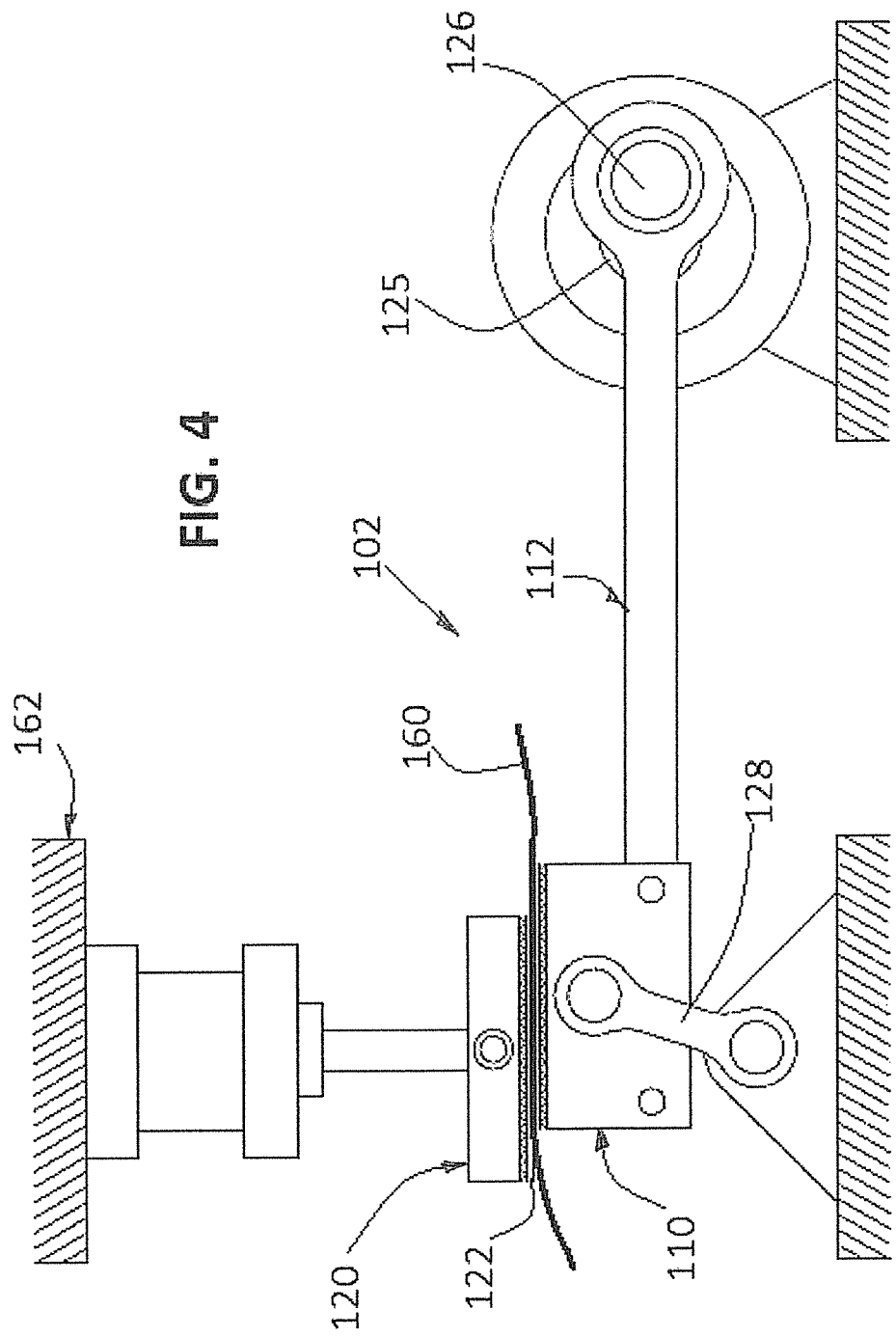

FIG. 4 shows the crank 125 at the three o'clock position and the link 128 at an angle, i.e., not orthogonal, to the weld plane 122.

Figure 5:
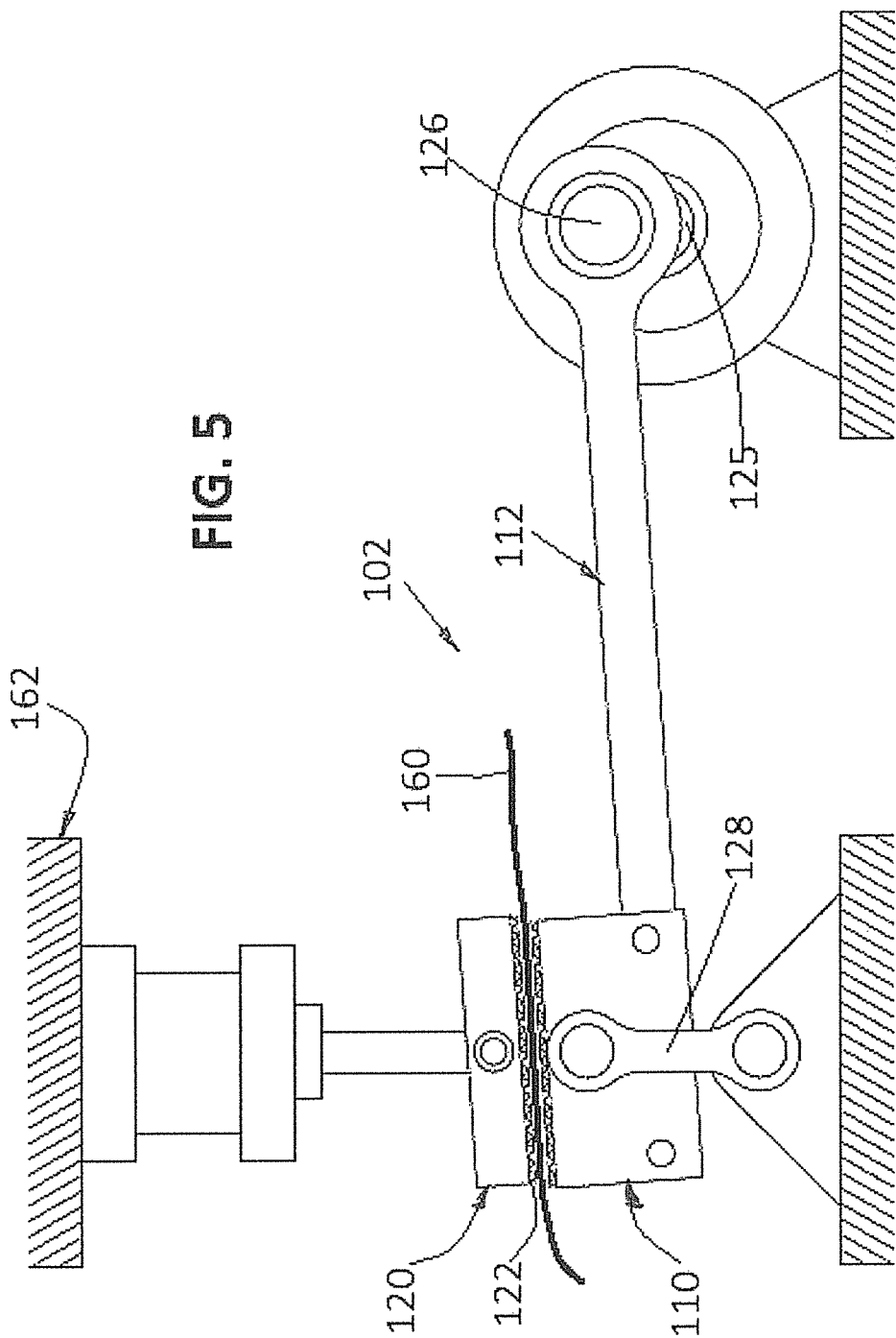

FIG. 5 shows the crank 125 at the twelve o'clock position, i.e., top dead center, and the link 128 generally perpendicular to the weld plane 122.

Figure 6:
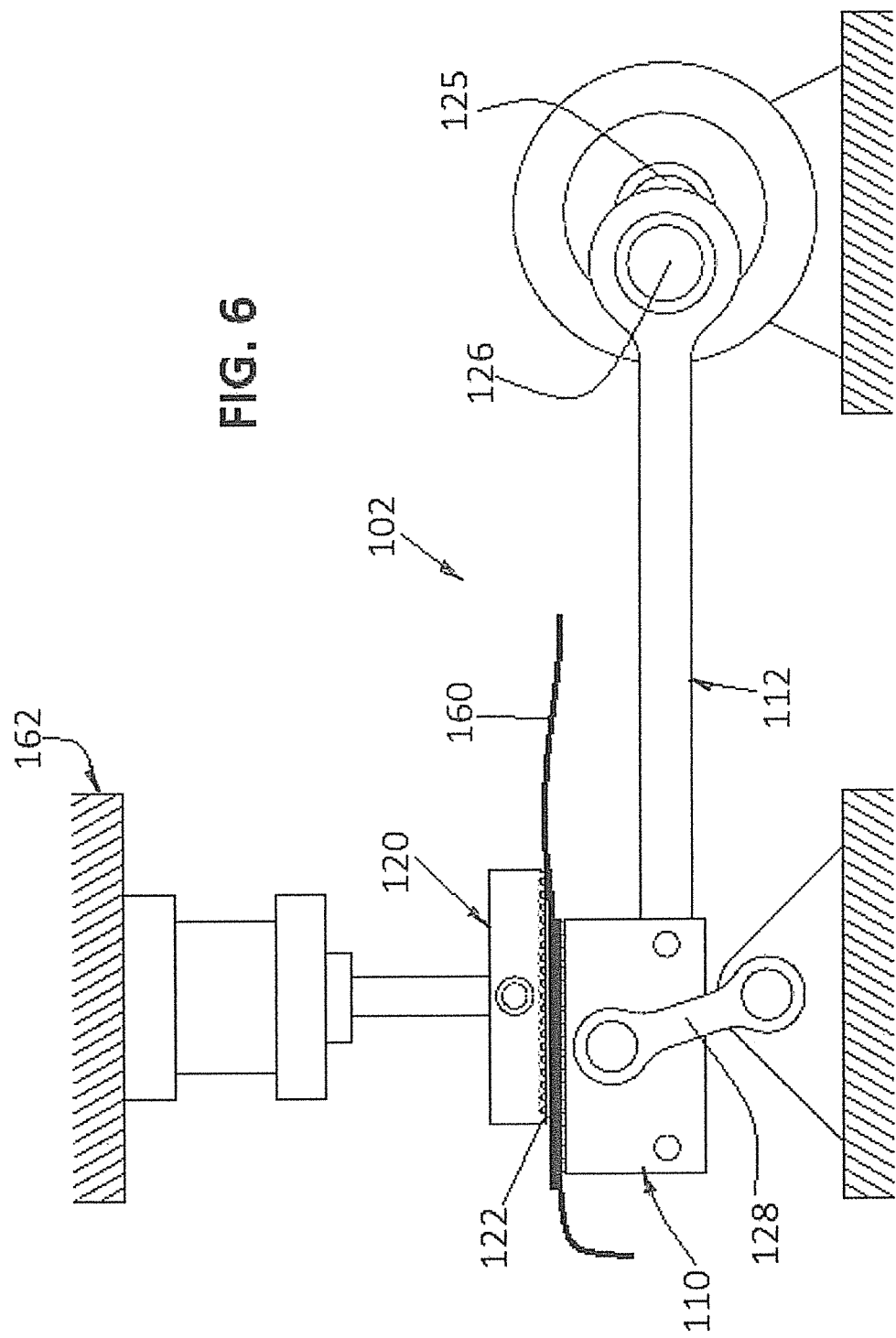

FIG. 6 shows the crank 125 at the nine o'clock position and the link 128 at an angle, i.e., not orthogonal, to the weld plane 122.

Note that the embodiment of FIGS. 3-6 has the base line value or data adjusted for jumping, i.e., to cause less jumping, at the weld jaws 110, 120.

Figure 7:
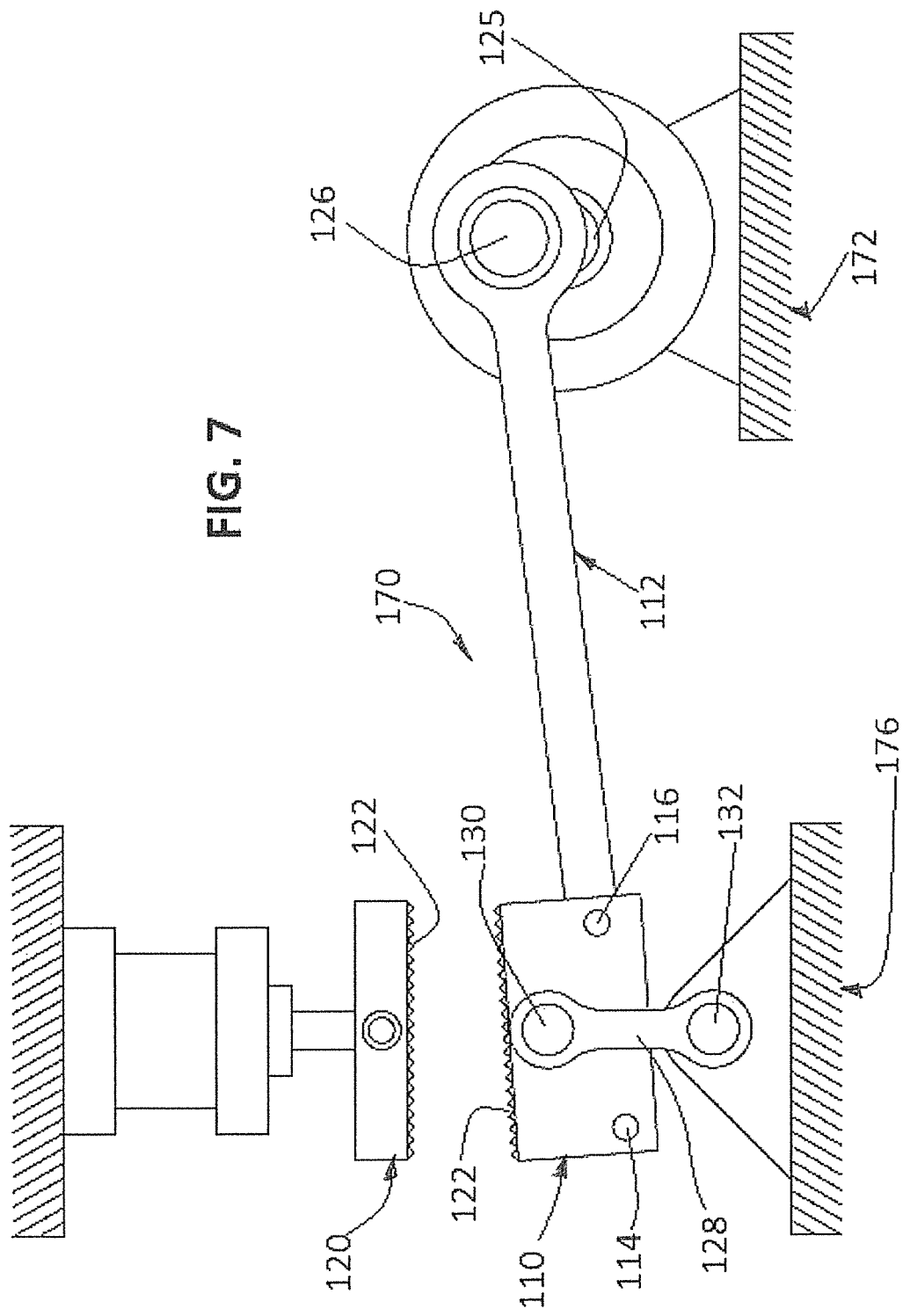

FIGS. 7-10 depict a weld assembly 170 provided in accordance to an alternative embodiment of the present disclosure. The weld assembly 170 is similar to the assembly 102 of FIGS. 3-6 but with the base 172 of the crank assembly 174 raised relative to the base 176 of the weld assembly. This can also be viewed as increasing the center line of the crank 125 relative to the upper pivot 130 of the fixed weld jaw 110. FIG. 7 shows the crank at the twelve o'clock position, which is analogous to the crank position of FIG. 5. In this position, the weld plane 122 is kept relatively the same or constant between the two figures even though the base 172 of the crank assembly has been raised. This may be accomplished by changing the connection points of the connecting rod 112 at the fixed weld jaw 110. As shown, the furthest most first pin 114 is at a lower position relative to the closer second pin 116 so as to form an angle between the connecting rod 112 center line and the weld plane 122. In one example, the modified angle is less than 90 degrees between the weld plane 122 and the connecting rod centerline, whereas the two reference points are generally parallel in FIG. 5.

Figure 8:
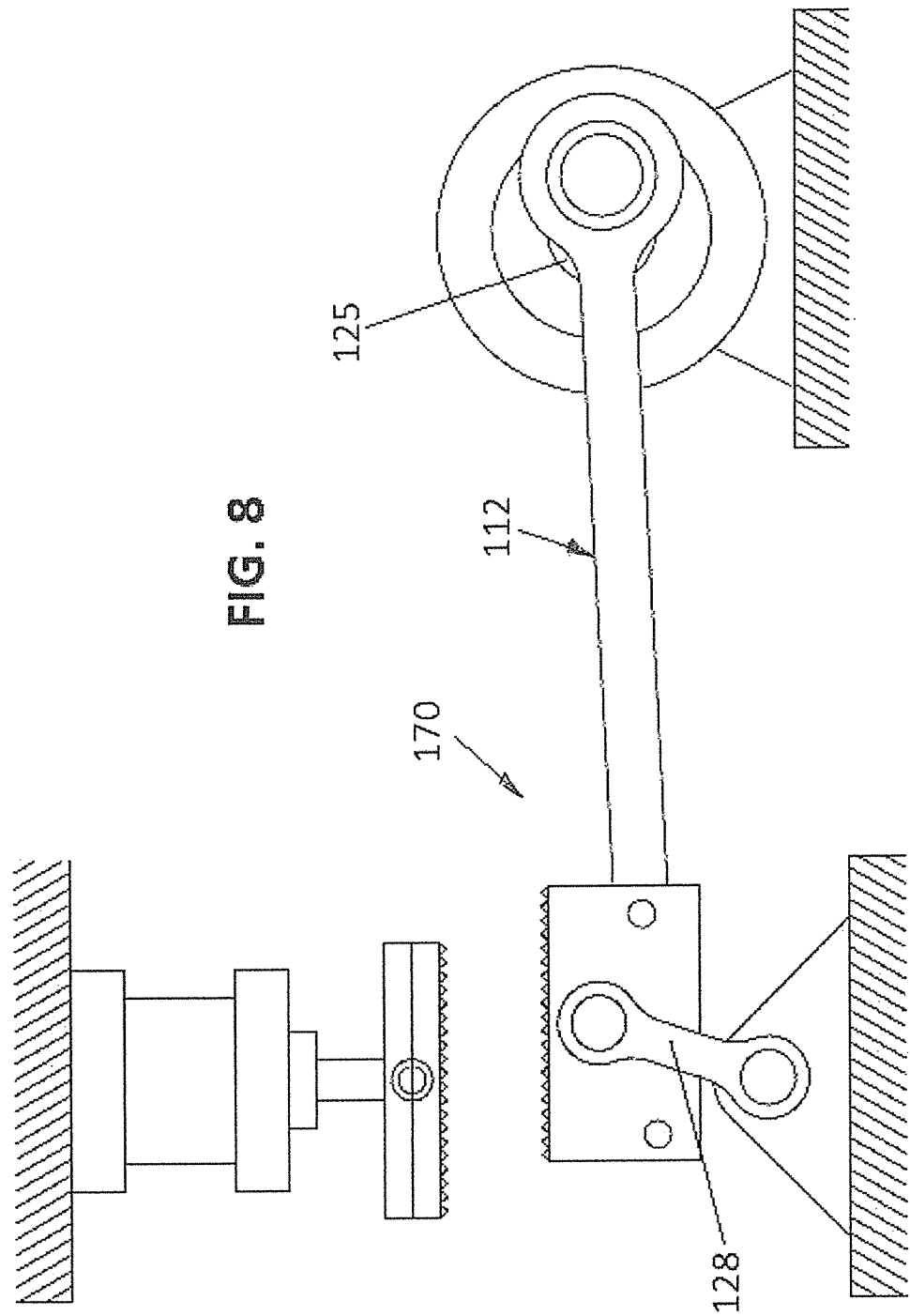

FIG. 8 shows the crank 125 at the three o'clock position and the link 128 at an angle, i.e., not orthogonal, to the weld plane 122.

Figure 9:
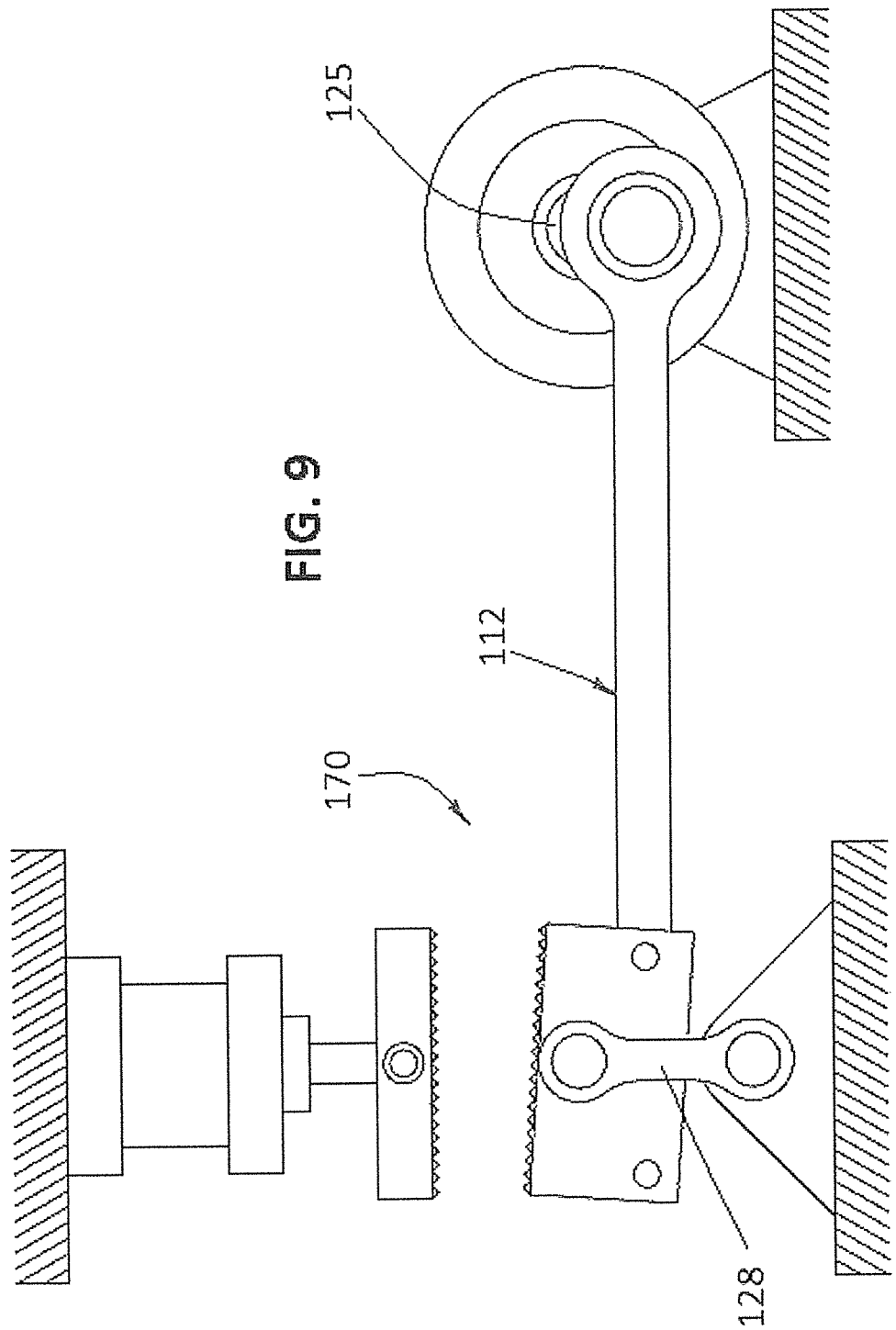

FIG. 9 shows the crank 125 at the six o'clock position and the link 128 generally perpendicular to the weld plane 122.

FIG. 10 shows the crank 125 at the nine o'clock position and the link 128 at an angle, i.e., not orthogonal, to the weld plane 122.

In one example, an adjustable tensioner 180, such as a set screw or the like, is provided on the base 172 of the crank assembly for adjusting the height of the crank relative to the upper pivot pin 130. In another example, an adjustable tensioner 182 is provided on the fixed weld jaw assembly to adjust the height of the upper pivot pin 130 relative to the crank center line. In still another example, an angular adjustable mechanism 184 is provided between the connecting rod 112 and the fixed weld jaw 110 to enable angular adjustment between the connecting rod centerline and the weld plane 122.

Thus, an aspect of the present method is a reduction in load swing by adjusting relative heights between the crank and the weld plane. Another aspect of the present method is a reduction in load swing by adjusting the height of the crank pivot relative to the upper pivot of the weld jaw. In still yet another aspect of the present method, a reduction in load swing is provided by lowering the height of the upper pivot on the weld jaw relative to the crank.

Although limited embodiments of strap welding systems and related methods and their components have been specifically described and illustrated herein, many modifications and variations will be apparent to those skilled in the art. Accordingly, it is to be understood that the strap welding systems and related methods and their components constructed according to principles of the disclosed device, system, and method may be embodied other than as specifically described herein. The disclosure is also defined in the following claims.

What is claimed is:

1. A method for welding two ends of a strap comprising:
  placing the two ends in between a stationary weld jaw and a fixed weld jaw and causing the stationary weld jaw and the fixed weld jaw to press the two ends; a weld plane is defined between the two weld jaws;
  fixing the fixed weld jaw to a connecting rod to prevent rotational and translational movement between the two;
  securing a link to the fixed weld jaw by a first pin and a lower end of the link to a structure by a second pin;
  securing the connecting rod to a crank and rotating the crank; and
  adjusting a centerline of the crank relative to the first pin.

2. The method for welding of claim 1, wherein the adjusting step comprises increasing a length of the crank.

3. The method for welding of claim 1, wherein the adjusting step comprises raising a base connected to the crank.

4. The method for welding of claim 1, wherein the adjusting step comprising adding shims.

5. The method for welding of claim 1, further comprising lowering, elevation-wise, the weld plane.

6. The method for welding of claim 1, further comprising adjusting an angle between a centerline of the connecting rod and the weld plane.

7. A system for welding comprising a plurality of weld assemblies, each of said weld assemblies comprising:
  a stationary weld jaw substantially stationary from translational movement;
  a fixed weld jaw secured to a connecting rod by at least two secured points; said fixed weld jaw and said connecting rod are fixed from rotational and translational movement relative to one another;
  a link pivotably connected to the fixed weld jaw by a first pivot pin and pivotably connected to a structure by a second pivot pin to angularly rotate relative to the fixed weld jaw and the structure;
  a crank pivotably connected to the connecting rod to impart reciprocating motion on the connecting rod; and
  wherein a centerline of the crank is adjustable relative to the first pivot pin.

8. The system of claim 7, further comprising a plurality of shims to change the position of the crank relative to the weld plane.

9. The system of claim 7, further comprising a plurality of teeth on the surface of the stationary weld jaw and the fixed weld jaw.

10. The system of claim 7, wherein the at least two secured points are fixed pins.

11. The system of claim 7, wherein the crank is operatively connected to a pulley system.

12. The method of claim 1, further comprising a feeder assembly for feeding the strap.

13. The method of claim 12, wherein the feeder assembly comprises a cutter for cutting the strap.

14. The system of claim 7, further comprising a tensioner operatively connected to the crank to change the position of the crank relative to the weld plane.

15. The system of claim 7, further comprising a second through six weld assembly located side-by-side.

16. The system of claim 7, wherein the crank comprises an eccentric pivot rod.

17. The system of claim 7, wherein the stationary jaw is coupled to a telescoping cylinder.

\* \* \* \* \*